(12) United States Patent
Iwashita et al.

(10) Patent No.: US 7,656,106 B2
(45) Date of Patent: Feb. 2, 2010

(54) SERVO CONTROLLER

(75) Inventors: Yasusuke Iwashita, Fujiyoshida (JP);
Yukio Toyozawa, Kumamoto (JP);
Kazuomi Maeda, Yamaga (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 591 days.

(21) Appl. No.: 11/482,011

(22) Filed: Jul. 7, 2006

(65) Prior Publication Data

US 2007/0007926 A1    Jan. 11, 2007

(30) Foreign Application Priority Data

Jul. 8, 2005    (JP)    ............................. 2005-200521
May 9, 2006    (JP)    ............................. 2006-130320

(51) Int. Cl.
*H02P 5/46*    (2006.01)
*B23Q 15/00*    (2006.01)

(52) U.S. Cl. ............................. 318/39; 318/572; 318/68

(58) Field of Classification Search .................... 318/5, 318/7, 68, 34, 37, 51, 115, 119, 560, 564, 318/568.1, 675, 39, 570, 572
See application file for complete search history.

(56) References Cited

U.S. PATENT DOCUMENTS

| | | | |
|---|---|---|---|
| 4,093,904 A | | 6/1978 | Burig et al. |
| 4,879,660 A | | 11/1989 | Asakura et al. |
| 5,666,034 A | | 9/1997 | Seoung et al. |
| 7,148,635 B1 * | | 12/2006 | Piefer et al. ................ 318/85 |
| 7,456,599 B2 * | | 11/2008 | Piefer et al. ............... 318/625 |
| 2004/0254680 A1 | | 12/2004 | Sunaoshi |
| 2005/0168178 A1 * | | 8/2005 | Toyozawa et al. ........... 318/68 |
| 2006/0186845 A1 * | | 8/2006 | Terada et al. .............. 318/432 |
| 2006/0267528 A1 * | | 11/2006 | Rehm ..................... 318/432 |
| 2008/0218116 A1 * | | 9/2008 | Maeda et al. .............. 318/571 |

FOREIGN PATENT DOCUMENTS

| | | |
|---|---|---|
| CN | 1150352 | 5/1997 |
| DE | 3811183 A1 | 10/1988 |
| DE | 4432143 | 3/1996 |
| EP | 0464496 A2 | 1/1992 |

(Continued)

OTHER PUBLICATIONS

Chinese Office Action mailed Nov. 30, 2007 issued in Chinese Application No. 2006101017819.

(Continued)

*Primary Examiner*—Walter Benson
*Assistant Examiner*—Eduardo Colon-Santana
(74) *Attorney, Agent, or Firm*—Drinker Biddle & Reath LLP

(57) ABSTRACT

There is provided a servo controller for synchronously controlling a master side drive source to drive one drive axis and a slave side drive source to drive the other drive axis. The servo controller includes a correction data calculation means for calculating correction data to correct a positional deviation of a slave side drive source according to a synchronization error which is a difference between a positional deviation of a master side drive source and a positional deviation of the slave side drive source, in which the correction data is added to the positional deviation of the slave side drive source.

10 Claims, 10 Drawing Sheets

FOREIGN PATENT DOCUMENTS

| | | |
|---|---|---|
| EP | 1471400 A1 | 10/2004 |
| JP | 3-252704 | 11/1991 |
| JP | 5-189019 | 7/1993 |
| JP | 6-309021 | 11/1994 |
| JP | 06351279 A * | 12/1994 |
| JP | 2001-030136 | 2/2001 |
| JP | 2003-131712 | 5/2003 |
| JP | 2003131712 A * | 5/2003 |
| JP | 2003-181722 | 7/2003 |
| JP | 2004-280772 | 10/2004 |
| JP | 2005-099981 | 4/2005 |
| JP | 2005-122647 | 5/2005 |
| JP | 2005-216135 | 8/2005 |

OTHER PUBLICATIONS

Japanese Notice of Reasons for Rejection mailed Sep. 16, 2008 issued in JP Application No. 2006-130320 (including a partial translation thereof).

* cited by examiner

SERVO CONTROLLER

BACKGROUND OF THE INVENTION

1. Field of the Invention

The present invention relates to a servo controller for synchronously controlling a master side drive source and a slave side drive source when the servo controller is applied to a machine in which the same machining is repeatedly conducted and, for example, thread cutting or tapping is repeatedly conducted.

2. Description of the Related Art

In general, in the case of machining a male screw on an outer circumferential face of a work, while the work chucked by a primary spindle is being rotated, a predetermined depth of cut is given to a thread cutting tool and the thread cutting tool is linearly moved in the axial direction of the work so as to conduct thread cutting on the work. In this case, in order to prevent the cutting tool from being given an excessively strong cutting force, the depth of cut is given to the cutting tool being divided by several times, that is, cutting of a predetermined depth is repeated by a predetermined number of times so that a perfect thread shape can be formed. In the case of machining a female screw on a work with a tap, the work is fixed onto a table which is moved in X-Y directions, and while the tap attached to the primary spindle is being rotated, the tap is fed in the axial direction of the rotary axis. On the contrary, while the tap is being rotated, the work is fed in the axial direction of the rotary axis. In this way, thread cutting is conducted.

A feed speed of the cutting tool in the case of machining a male screw and a feed speed of the tap in the case of machining a female screw are determined according to the rotary speeds of the work and tap so that the screw can be continuously formed at a predetermined pitch. That is, a movement command (feed speed) of the cutting tool or the tap, which is linearly moved, and a rotation command (rotary speed) of the rotating work or the rotating tap are maintained at a predetermined ratio. Therefore, in this type of thread cutting or tapping, in order for both drive sources (servo motors) to be synchronously driven at a predetermined ratio, the rotation command and the movement command are given by a numerical controller of a machine tool.

An example is explained below in which a screw of 1 mm pitch is machined at 6000 min$^{-1}$. In this case, a position detecting unit of a feed axis driven by one drive source is 10000 pulse/mm and a position detecting unit of a rotary axis driven by the other drive source is 4096 pulse/rev. When consideration is given to a movement command of the feed axis, the rotary axis is rotated one revolution in 10 ms and the feed axis advances 1 mm per revolution. Therefore, the number of pulses becomes 10000 pulse/10 ms. A feed speed of the feed axis becomes 6 m/min. On the contrary, the number of pulses of the rotary axis becomes 4096/10 ms. Accordingly, a ratio of one drive axis to the other drive axis is K=4096/10000. Accordingly, when a movement command for the drive source to drive the feed axis is multiplied by 4096/10000 and the thus obtained command is made to be a movement command for the drive source to drive the rotary axis, it is possible to machine a screw of 1 mm pitch.

This is an example in which a pair of driving axes are a rotary axis and a feed axis. However, both of the pair of driving axes may be respectively a feed axis. Alternatively, both of the pair of driving axes may be respectively a rotary axis. That is, the present invention is not limited to the above specific embodiment of the drive axis.

In this connection, the official gazette of JP-A-2004-280772 discloses an example of the conventional servo controller in which the respective drive sources of the rotary and the feed axis are synchronously controlled so that a work can be repeatedly machined into the same shape.

As described before, in the case where a male screw is machined on an outer circumferential face of a work or a female screw is machined at a predetermined position of a work with a tap, it is necessary that drive sources for respectively driving a rotary axis and a feed axis are synchronized with each other. It is conventional to conduct machining in such a manner that a movement command of one drive source is multiplied by a specific ratio and the other drive source is driven according to thus multiplied movement command.

However, in the case of machining a male screw or a female screw, as long as the servo characteristics of the drive sources, which are driven synchronously with each other, are the same, the rotary axis and the feed axis have the same positional deviation. Therefore, from the theoretical view point, no synchronization error is caused. However, in the case where inertia of the rotary axis is increased according to an enhancement of the rigidity of the rotary axis or in the case where the rotary axis is rotated at a high speed, the servo characteristic of the rotary axis is inferior to that of the feed axis. Accordingly, a large positional deviation is generated at the time of acceleration and deceleration of the rotary axis. Further, the synchronization error is increased by a cutting disturbance such as a change in the depth of cut of a cutting tool or a shock caused at the time of starting cutting. Furthermore, the synchronization error is increased by the friction. Being affected by the cutting disturbance and friction, the accuracy of machining a screw is deteriorated.

When the positional deviation of each axis can be made to come close to 0 by conducting learning control on the individual positional deviation of both axes, the synchronization error can be made come close to 0. However, although the inertia is high especially on the rotary axis side, it is necessary to rotate the rotary axis at a high speed. For the above reason, there is a high possibility that the learning control cannot exhibit the effect because it is restricted by the maximum torque of a motor. Explanations are made by referring to an example shown by the paragraph number 0004 as follows. When the rotary speed of the primary spindle is 6000$^{-1}$, the speed of the feed axis is 6 m/min$^{-1}$, and the rotation-linearity conversion coefficient (for example, the pitch of a ball screw) is 10 mm/rev. In this case, the rotary speed of the feed axis is 600 min$^{-1}$ which is $\frac{1}{10}$ of the rotary speed of the rotary axis. In this way, even when the axes are driven by the same synchronization command, the speed of the rotary axis must be higher than that of the feed axis by 10 times. Therefore, even when both axes are rotated by the same acceleration and deceleration time constant, a higher torque must be given to the rotary axis, which is very difficult from the practical viewpoint. Therefore, it is reasonable that the synchronous error is learned and controlled by the feed axis because this method is more advantageous from the viewpoints of speed and inertia than the method of learning the positional deviation of both axes.

SUMMARY OF THE INVENTION

An object of the present invention is to provide a servo controller capable of highly accurately and efficiently conducting machining by reducing a synchronization error between a rotary axis side and a feed shaft side even when the inertia of the rotary axis is high or even when the rotary axis is rotated at a high speed.

In order to accomplish the above object, the present invention provides a servo controller by which a master side drive source for driving one drive axis and a slave side drive source for driving the other drive axis are synchronously controlled, and the servo controller includes a correction data calculating means for calculating correction data to correct positional deviation of the slave side drive source according to the synchronous error, which is a difference between the positional deviation of the master side drive source and the positional deviation of the slave side drive source, wherein the correction data is added to the positional deviation of the slave side drive source.

According to the present invention described above, the correction data calculating means calculates correction data to correct the positional deviation of the slave side drive source according to the synchronization error, and when this correction error is added to the positional deviation of the slave side drive source, it is possible to conduct control so that the synchronization error can come close to zero. Therefore, an amount of the positional deviation of the slave side motor can be adjusted according to an amount of positional deviation of the master side drive source. That is, in the case where the amount of the positional deviation of the master side drive source is large, correction is conducted so that the amount of the positional deviation of the slave side drive source can be increased. In the case where the amount of the positional deviation of the master side drive source is small, correction is conducted so that the amount of the positional deviation of the slave side drive source can be decreased. Accordingly, the synchronization error can be reduced in the case where the inertia of the master side drive source is high or in the case where the master side drive source is rotated at a high speed or in the case where cutting disturbance is generated by a shock caused when the depth of cut of a cutting tool changes or when the cutting tool starts cutting. Due to the foregoing, machining can be conducted highly accurately and efficiently.

The present invention provides a servo controller by which a master side drive source for driving one drive axis and a slave side drive source for driving the other drive axis are synchronously controlled, and the servo controller includes: a selection means capable of selecting one of the synchronization error, which is a difference between the positional deviation of the master side drive source and the positional deviation of the slave side drive source, and the positional deviation of the slave side drive source; and a correction data calculating means for calculating correction data to correct positional deviation of the slave side drive source according to one data selected by the selecting means, wherein the correction data is added to the positional deviation of the slave side drive axis and control is conducted so that the positional deviation or the synchronous error can come close to zero.

According to this invention, in the case where an amount of the positional deviation of the master side drive source is large, the selection means selects the synchronization error, and an amount of the positional deviation of the slave side motor can be adjusted according to an amount of the positional deviation of the master side drive source. Due to the foregoing, the synchronization error can be reduced in the case where the inertia of the master side drive source is high or in the case where the master side drive source is rotated at a high speed or in the case where cutting disturbance is generated by a shock caused when the depth of cut of a cutting tool changes or when the cutting tool starts cutting. Due to the foregoing, machining can be conducted highly accurately and efficiently. On the other hand, in the case where an amount of the positional deviation of the master side drive source is small, the selection means selects the positional deviation of the slave side drive source. According to the amount of this positional deviation, an amount of the positional deviation of the slave side motor can be adjusted. As described above, as one of the synchronous error and the positional deviation can be selected by the selection means, the specification of the servo controller can be changed according to the specification of a machine and the machining accuracy of a product. Accordingly, the flexibility of the servo controller can be enhanced.

The present invention provides a servo controller applied to a machine having a rotary axis as one drive axis described above and also having a feed axis as the other drive axis described above. According to this invention, the rotary axis is likely to be affected by inertia. Therefore, the positional deviation tends to be increased. However, when the positional deviation of the feed axis is adjusted according to the synchronization error between the rotary axis and the feed axis, the synchronization accuracy of the synchronization control can be enhanced.

The present invention provides a servo controller applied to a machine for conducting tapping so as to form a female screw in a work. According to this invention, since the machining repeatedly conducted by the machine is tapping, it is possible to reduce the synchronization error of a rigid tap at the time of a normal rotation and at the time of a reverse rotation. Accordingly, it is possible to highly accurately and efficiently conduct machining.

The present invention provides a servo controller applied to a machine for thread cutting by which a male screw is formed on an outer circumferential face of a work. According to this invention, as the machining repeatedly conducted by the machine is the thread cutting, when a perfect screw is formed with a cutting tool reciprocated by a predetermined number of passes, the repetition accuracy of each pass is enhanced. Accordingly, the occurrence of a positional difference is prevented and a highly accurate screw can be formed.

The present invention provides a servo controller applied to a machine having two slave side drive sources in which the slave side drive sources respectively drive a first feed axis and a second feed axis of the tandem structure which are arranged in parallel to each other. According to this invention, when two slave side drive sources respectively drive the first feed axis and the second feed axis of the tandem structure, it is possible to reduce a load given to each drive source. Accordingly, the following property of the servo controller can be enhanced. Further, a drive source to be used can be downsized, which can reduce the manufacturing cost.

The present invention provides a servo controller in which the correction data calculated according to the synchronization error between the master side drive source and one slave side drive source is added to the positional deviation of both the slave side drive sources. According to this invention, the two slave side drive sources can use the correction data calculating means in common. Accordingly, it is possible to provide a simple structure for the servo controller.

The present invention provides a servo controller in which the correction data calculating means is used by the two slave side drive sources in common and in which two synchronization errors, which are inputted into the correction data calculating means, are weighted by a predetermined internal ratio according a load balance of the first and the second feed axis. According to this invention, in the case where two slave side drive sources use the correction data calculating means in common, the correction data is calculated according to two synchronization errors in which the correction data is weighted. Therefore, it is possible to obtain an averaged correction data for correcting the positional deviation of both the slave side drive sources. Therefore, even when the correction data calculating means is used in common, it is possible to maintain the synchronization accuracy.

The present invention provides a servo controller further including a storage means for storing the correction data for each period with reference to time so as to conduct the learning control. According to this invention, in the case where the same machining such as thread cutting or tapping is repeatedly conducted, each time the machining is repeated, the synchronization error can be gradually reduced. It is possible to finally converge the synchronization error to zero. Accordingly, the machining can be highly accurately conducted.

The present invention provides a servo controller further including a storage means for storing the correction data for each sampling with reference to position when the time is converted to the position so as to conduct the learning control. According to this invention, when the learning control is conducted with reference to position, the memory size can be made to be constant without relying on the machining speed. Therefore, it is possible to save the memory, which is advantageous from an economic viewpoint.

The present invention provides a servo controller in which a movement command sent to the master side drive source and the slave side drive source has an identification number, and the servo controller further includes a changeover means for changing over a storage region for conducting the learning control corresponding to the identification number. According to this invention, the servo controller includes a means for changing over a storage region of the learning control by the identification number. Accordingly, in the case where the synchronization command is different, for example, in the case where a screw depth, a screw pitch or a primary spindle rotary speed is different, the command is different. Therefore, it is necessary to do the learning control once more. However, when the storage region is changed over for each command, it becomes possible to cope with a different type synchronization command. Therefore, the flexibility can be enhanced.

BRIEF DESCRIPTION OF THE DRAWINGS

The above and other objects, characteristics and advantages of the present invention will become more apparent from the following descriptions of embodiments with reference to the accompanying drawings in which.

DETAILED DESCRIPTION

Figure 1:
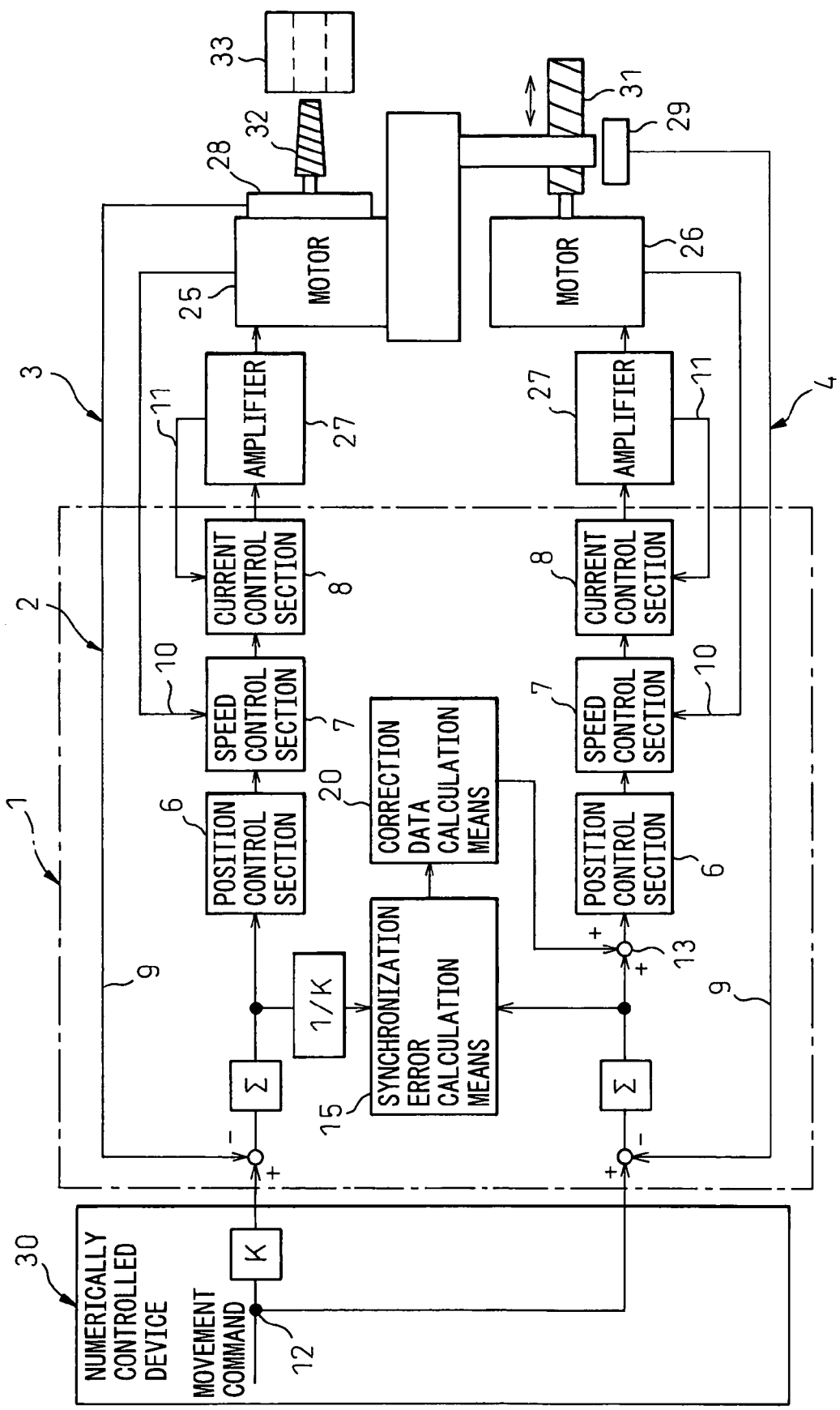
FIG. 1 is a block diagram of a servo controller of the first embodiment of the present invention.

Referring to the drawings, a specific embodiment of the present invention will be explained in detail as follows. FIG. 1 is a block diagram of a servo controller of the first embodiment of the present invention. This servo controller 1 is composed in substantially the same manner as that of the conventional device except that the servo controller 1 includes a synchronization error calculation means 15 and a correction data calculation means 20 which are characteristic portions of the present invention. Therefore, FIG. 1 shows an outline of the structure of the first embodiment of the present invention.

The servo controller 1 of this embodiment is applied to a machine tool and connected to a numerical controller 30, which is a host controller, via a common memory not shown. A movement command outputted from the numerical controller 30 enters the servo controller 1, and a primary spindle (a first drive axis) and a table of the machine tool are synchronously controlled by servo motors (drive sources) 25, 26 which respectively function as an actuator.

The numerical controller 30 is connected to a programmable controller, an operation panel and a spherical device which are not shown in the drawing. The common memory is a storage device for delivering information, which is outputted from the numerical controller 30, to a processor of the servo controller 1 and on the contrary for delivering various information, which is outputted from the servo controller 1, to the numerical controller 30.

The servo controller 1 includes: a digital servo circuit 2 having a processor, ROM and RAM; a synchronization error calculation means 15 for calculating a synchronization error of a pair of servo motors 25, 26; and a correction data calculation means 20 for calculating correction data for correcting a positional deviation of the servo motor 26 on the feed side (the slave side) according to the synchronization error. Although explanations of the synchronization error calculation means 15 and the correction data calculation means 20 will be made later, when the servo controller 1 includes both the means 15, 20, the following property of the spindle motor 25, which is a servo motor on the master side, with respect to the synchronization error of the servo motor 26 on the feed side is remarkably enhanced. Accordingly, it becomes possible to highly accurately and efficiently conduct machining.

The digital servo circuit 2 is substantially the same as that of the prior art. In the digital servo circuit 2, the spindle motor 25 for rotating the main spindle not shown and the servo motor 26 on the feed axis for feeding a cutting tool not shown along a feed shaft not shown are subjected to the position loop control 9 and the speed loop control 10 according to a feedback signal. Further, in the digital servo circuit 2, the current loop control 11 is also conducted according to a current feedback signal sent from an amplifier 27 such as a transistor inverter.

The spindle motor 25 and the feed side servo motor 26 are controlled by the servo controller 1 being synchronized with each other. For example, in the case where a female screw is formed in a work 33, which is fixed to the table, with a tap 32 chucked to a spindle not shown in the drawing, the servo motor 26 on the feed side is synchronously controlled so that the tap 32 can be moved in the axial direction at a feed speed which is obtained when a rotary speed of the spindle motor 25 is multiplied by a screw pitch which is a conversion coefficient.

Referring to FIG. 1, the flow of the servo controller 1 for the spindle motor 25 and the servo motor 26 on the feed side will be explained below. First, a moving (position) command per unit time outputted from the numerically control device 30 branches at a branch point 12. One movement command is multiplied by a conversion coefficient K of a predetermined ratio. Then, the movement command is outputted to the primary spindle side circuit 3 for controlling the spindle motor 25 of the servo controller 1. The other movement command is outputted as it is to a feed axis side circuit 4 for controlling the servo motor 26 on the feed side of the servo controller 1.

In the primary spindle side circuit 3, a position deviation is found in such a manner that a detection value of the position feedback, which is outputted from a position detector 28 such as a pulse coder for detecting a position of the spindle motor 25, is subtracted from the movement command which has been multiplied by the conversion coefficient K (the position loop control 9). After that, when the time integral calculus is conducted by an integrator Σ, the position deviation is found. Next, in the position control section 6, this position deviation is multiplied by a position loop gain so as to find a speed command. Successively, in the speed control section 7, a detection value of the speed feedback, which is outputted from the speed detector for detecting a speed of the spindle motor 25, is subtracted from this speed command so as to find a speed deviation (the speed loop control 10). Then, the proportional integral calculus control (PI control) is conducted on this speed deviation so as to find a current command (torque command). Then, in the current control section 8, a detection value of the current feedback from the amplifier 27 is subtracted from this current command so as to find a current deviation (the current loop control 11). Then, the spindle motor 25 is driven via the amplifier 27, so that a tap 32 and a work are rotated via a speed reduction mechanism not shown in the drawing.

In the same manner as that of the primary spindle side circuit 3, in the feed axis side circuit 4, the position loop control 9, the speed loop control 10 and the current loop control 11 are executed. The feed side servo motor 26 is driven via the amplifier 27, and the feed screw 31 is rotated by a speed reduction mechanism not shown, so that the tap 32 can be fed in the axial direction.

The above servo control conducted according to the digital servo circuit 2 is substantially the same as the conventional control. As described before in the description of the prior art, in the control conducted only by the digital servo circuit 2, an amount of the position deviation is increased. Accordingly, there is a possibility that it is impossible to sufficiently cope with an increase in the inertia, which is caused when the rigidity of the primary spindle is enhanced, and to cope with an increase in the rotary speed of the primary spindle. As a countermeasure for solving the above problems, the device of the present invention includes a synchronization error calculation means 15 and a correction data calculation means 20 in addition to the digital servo circuit 2 so that the present invention can be applied to a machine, the rigidity of the primary spindle of which is high and the speed of the primary spindle of which is also high. The synchronization error calculation means 15 is an subtraction means for finding the synchronization error which is a difference between the position deviation of the primary spindle side circuit 3 and the position deviation of the feed side circuit 4. The positional deviation of the primary spindle side circuit 3 is found when the positional deviation of the spindle motor 25 is multiplied by the inverse conversion coefficient ($K^{-1}$) so that the positional deviation of the primary spindle side circuit 3 can be converted to a value of the same unit as that of the positional deviation of the feed side circuit 4. When the unit of the primary spindle side circuit 3 is made to be the same as that of the feed side circuit 4 as described above, it is possible to find a synchronization error corresponding to a difference between both the motors 25 and 26.

The correction data calculation means 20 receives a synchronization error from the synchronization error calculation means 15 and calculates correction data to correct the positional deviation of the feed side servo motor 26 according to this synchronization error. Then, the correction data calculation means 20 outputs this correction data. When the correction data is added to the positional deviation of the feed side servo motor 26 at the addition point 13, the processing to make the synchronization error between both the motors 25 and 26 to be zero is completed. The feed side servo motor 26 is rotated according to the corrected positional deviation. With respect to the spindle motor 25, the feed side servo motor 26 is rotated while a predetermined rate of timing is being maintained.

As described above, according to the present embodiment, it is possible to adjust a positional deviation of the feed side servo motor 26 according to an amount of the positional deviation of the spindle motor 25. Therefore, even in the case where the inertia of the spindle motor 25 is high or a disturbance is caused by the fluctuation of the cutting force or in the case where the spindle motor 25 is rotated at a high speed, both the motors 25 and 26 can be rotated while a predetermined timing is maintained between them. Therefore, the synchronization error can be reduced and it is possible to machine a work highly accurately and efficiently.

Figure 2:
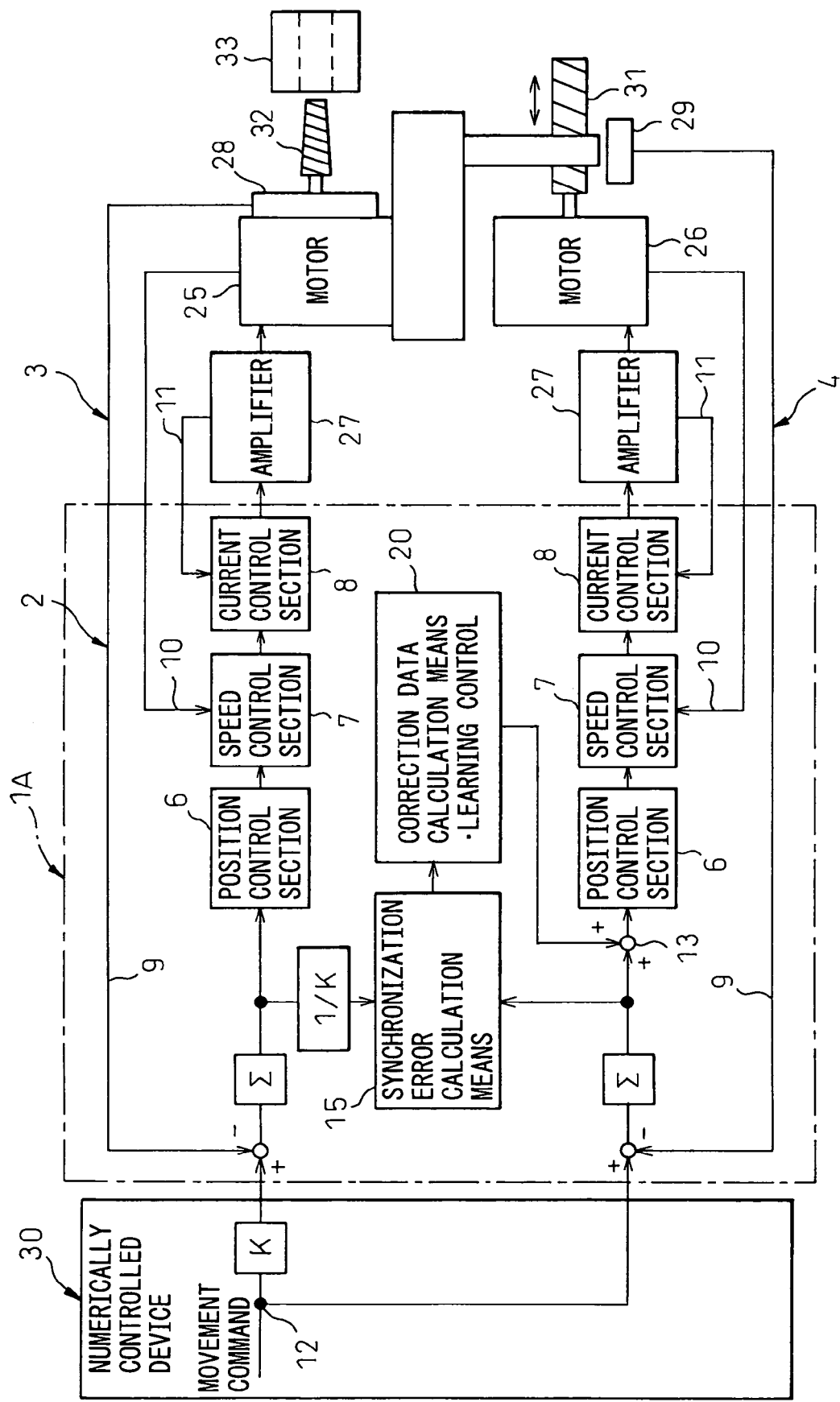
FIG. 2 is a block diagram of a servo controller of the second embodiment of the present invention.
Figure 3:
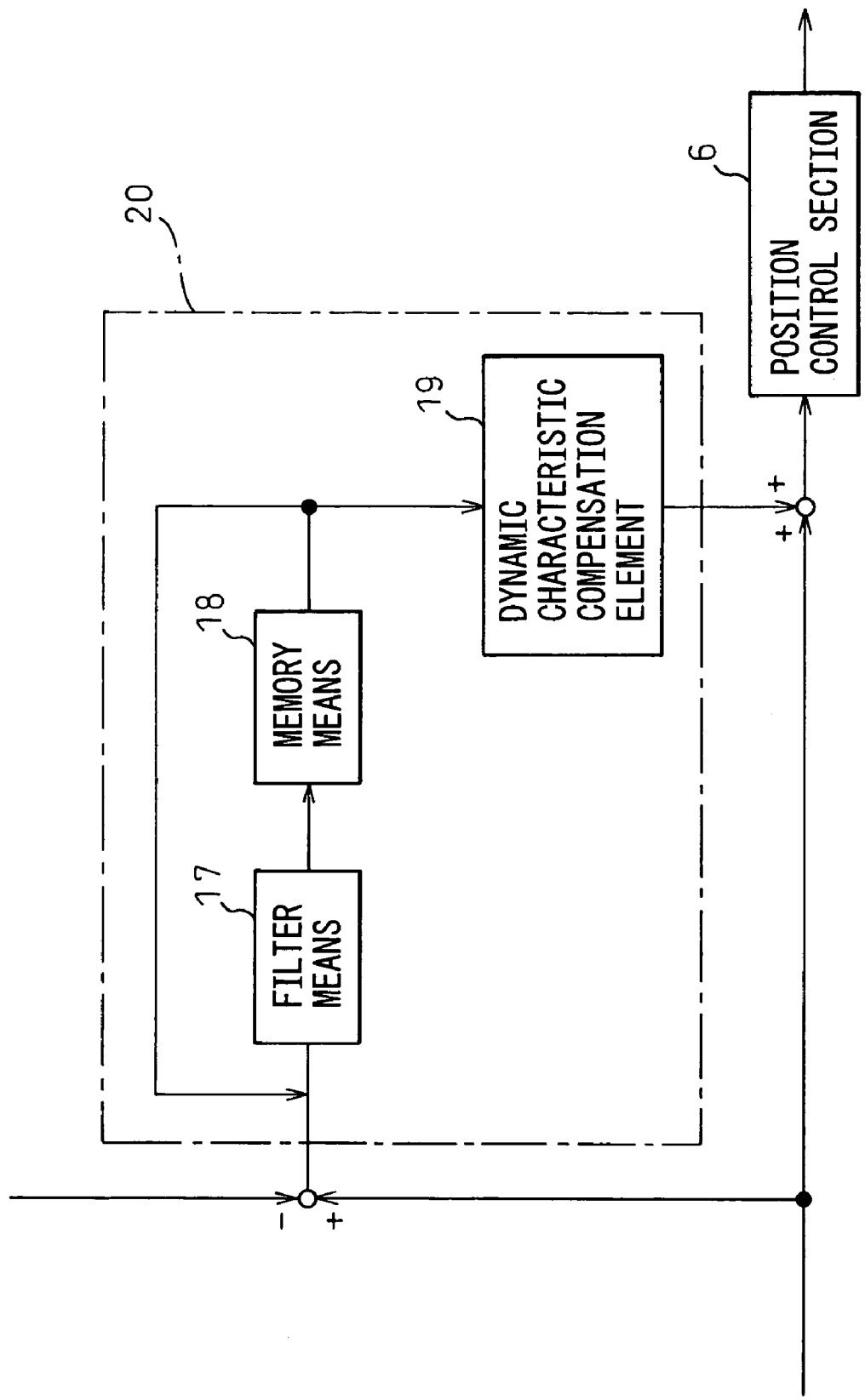
FIG. 3 is a view showing a correction data calculation means in detail which is shown in FIG. 2.

Next, referring to FIGS. 2 and 3, the second embodiment of the servo controller of the present invention will be explained below. The servo controller 1A of this embodiment is different from the servo controller 1 of the first embodiment at the point that the correction data calculated by the correction data calculation means 20 can be controlled by learning.

The correction data calculation means 20 includes: a filter means 17 for restricting a resonance frequency band; a memory means 19 for storing correction data; and a dynamic characteristic compensation element 19 to compensate a phase delay and a gain reduction of the servo motor 26 which is an object to be controlled. The memory means 18 has a memory region corresponding to the sampling number. When the work 33 is machined by a predetermined depth of cutting, the memory means 18 accommodates a large number of correction data calculated according to the synchronization error detected by a predetermined sampling time.

The old correction data accommodated in the memory means is read out at each predetermined sampling time at the next time of machining in which the cutting tool moves in the same path as that of the machining conducted before. The correction data, which has been read out in this way, is added to the synchronization error corresponding to the predetermined sampling time found by the synchronization error calculation means 15. The data is subjected to filter processing and then accommodated in the memory means 18 as renewed correction data. On the other hand, the old data, which has been read out by the memory means 18, is subjected to the compensation of a phase delay and a gain reduction. Then, the data is added to the positional deviation at the addition point 13 and the processing is conducted so that the synchronization error of both the motors 25 and 26 can be made to be zero, and the thus processed data is inputted into the position control section 6. The correction of the positional deviation and the renewal of the correction data for each machining are repeatedly conducted until the machining program is completed. Due to the foregoing, machining can be highly accurately conducted.

Figure 4:
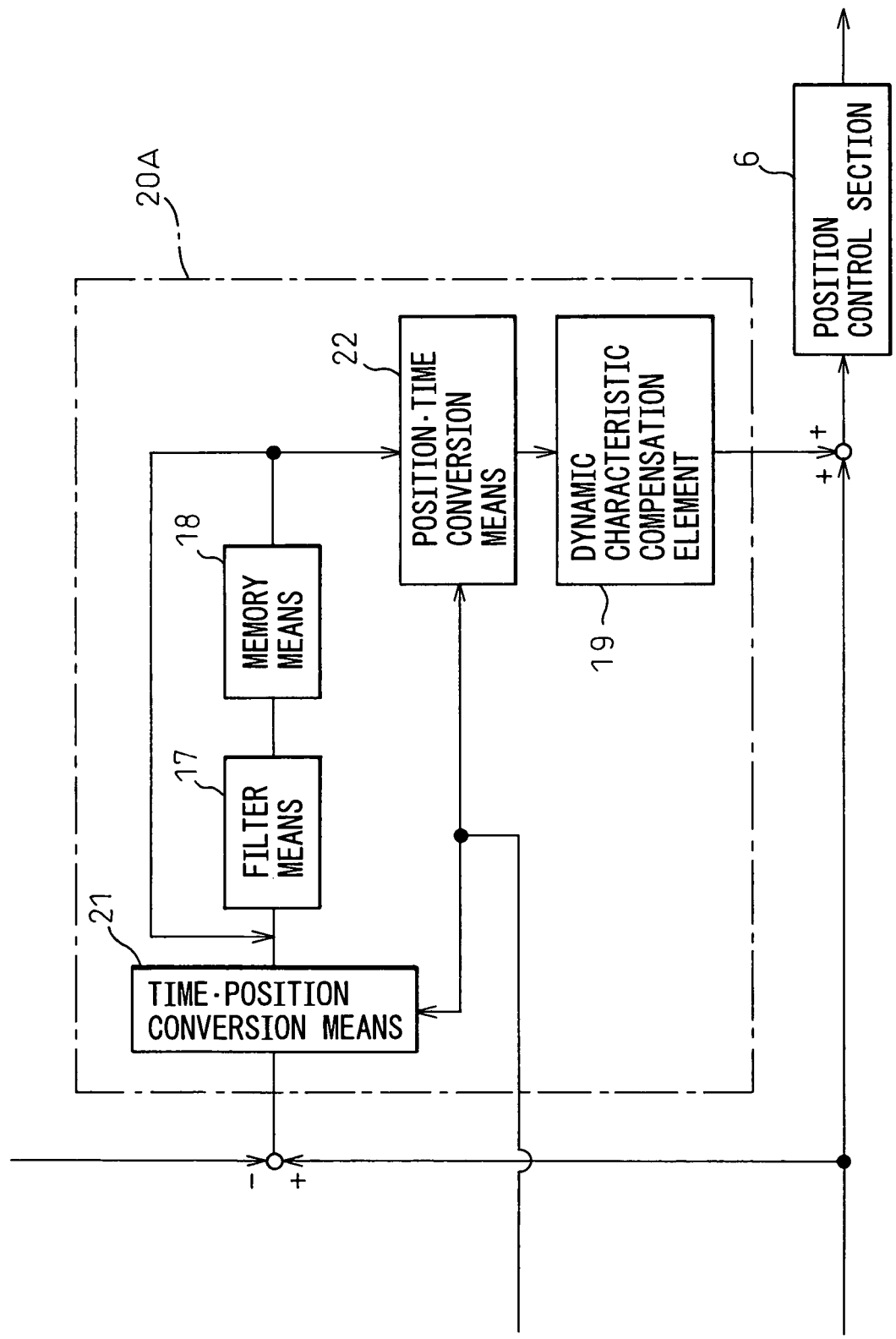
FIG. 4 is a view showing a variation of the correction data calculation means.

FIG. 4 is a view showing a variation of the correction data calculation means having a memory means. This variation is composed in such a manner that a time to position conversion means 21 and a position to time conversion means 22 for finding correction data corresponding to a sampling position are added to the correction data calculation means 20 shown in FIG. 3. The time to position conversion means 21 converts a position deviation at each predetermined sampling position to a position deviation for a predetermined position according to a reference position. The position to time conversion means 22 returns correction data at each predetermined position corresponding to each sampling position to correction data corresponding to the time.

In this case, the reference position is a position which can be a reference for synchronizing the feed side servo motor 26 with respect to the spindle motor 25. That is, the reference position is a position feedback (an actual position) detected by the detection means of the spindle motor 25 or the feed side servo motor 26. Alternatively, the reference position is a position command. The number of memories (the memory region) of the memory means 18 is found corresponding to the sampling number ($2\pi/d$), wherein $2\pi$ is a machining length of one pass and d is a division width. In this case, the predetermined position is a grid position previously determined according to the reference position. In this connection, a method of calculating the correction data with reference to position is explained in detail in the specification of application filed before (JP-A-20005-216135). Therefore, a detailed explanation is not given here.

According to the variation composed described above, the learning control is conducted with reference to position. Therefore, in the case where the sampling number is constant, it is possible to make the memory size constant irrespective of the machining speed, that is, the memory size can be reduced.

Figure 5:
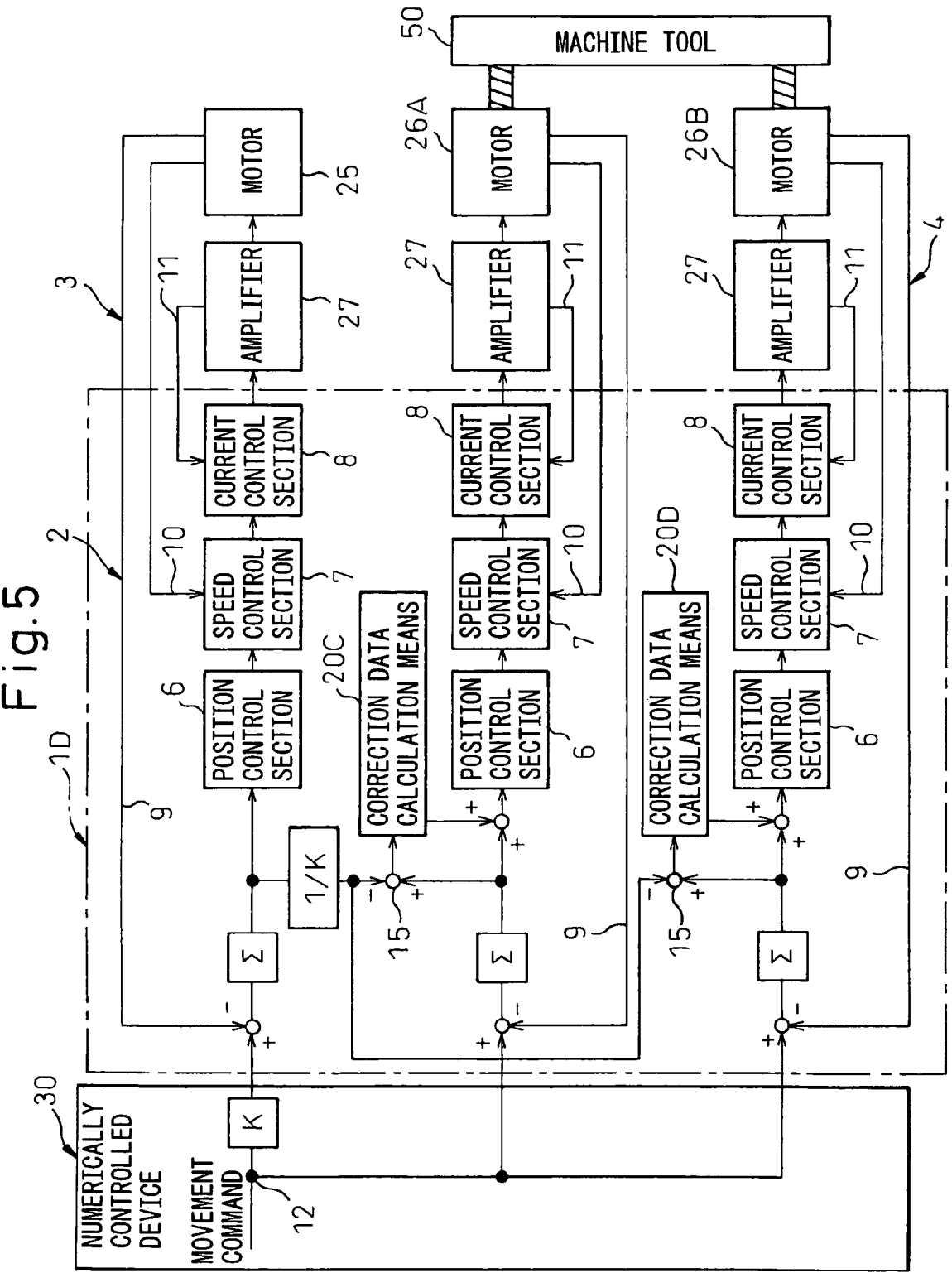
FIG. 5 is a block diagram of a servo controller of the third embodiment of the present invention.
Figure 6:
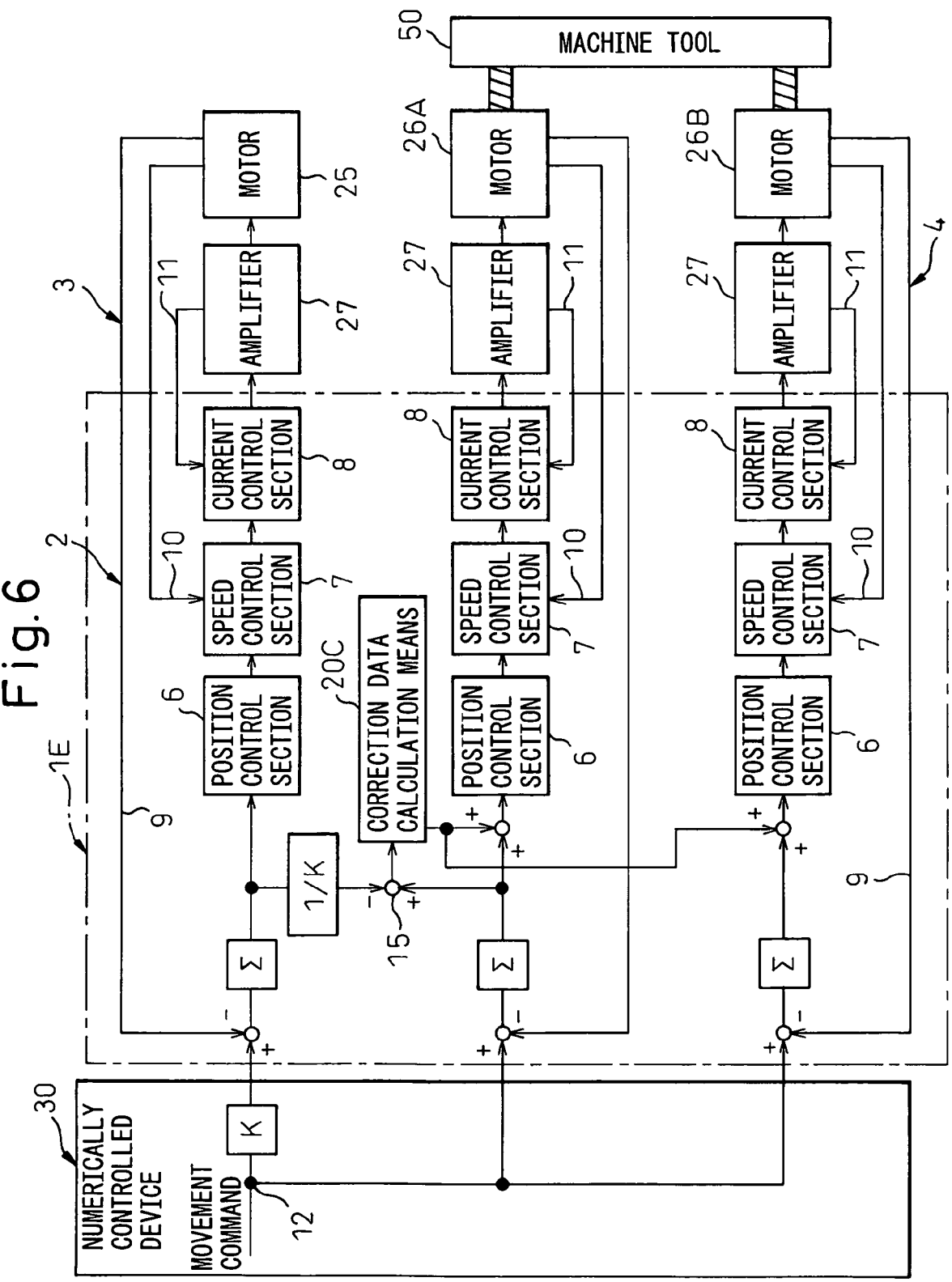
FIG. 6 is a block diagram of a servo controller of the fourth embodiment of the present invention.
Figure 7:
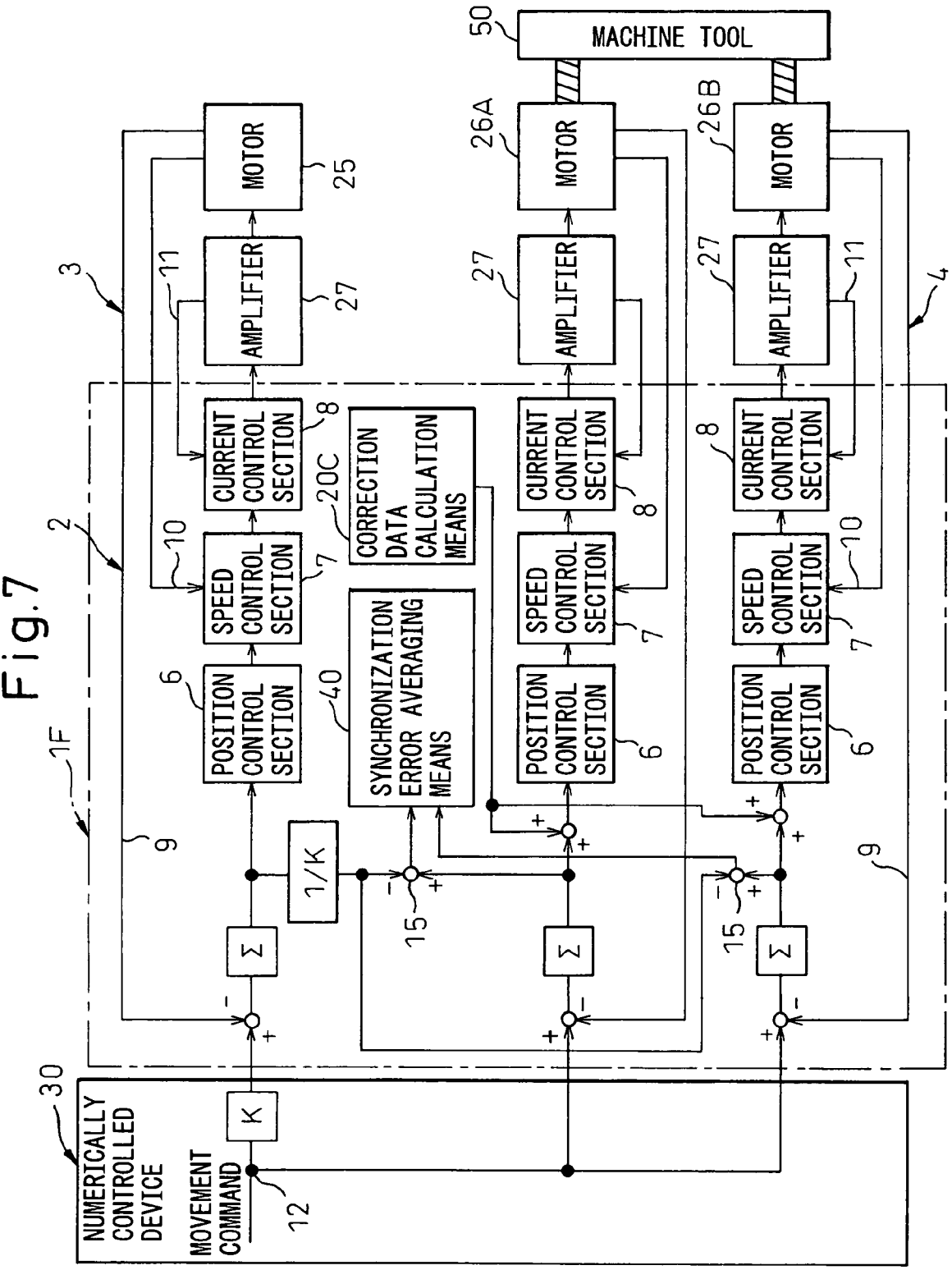
FIG. 7 is a block diagram of a servo controller of the fifth embodiment of the present invention.

Next, referring to FIGS. 5 to 7, another embodiment of the servo controller of the present invention will be explained below. FIG. 5 is a view showing the third embodiment of the servo controller, FIG. 6 is a view showing the fourth embodiment of the servo controller, and FIG. 7 is a view showing the fifth embodiment of the servo controller. These embodiments are common at the point that the embodiments can be applied to a machine tool 50 having two tandem type feed side servo motors 26A, 26B.

The machine tool having two or more tandem type feed side servo motors is commonly used. In this tandem type machine tool, as a plurality of servo motors are provided, the load given to each motor can be reduced. Therefore, a body to be driven can be stably driven. Further, the body to be driven can be driven, with respect to the master side spindle motor, with a good following performance. Furthermore, when a plurality of motors are provided, it is possible to increase an output of the machine tool.

The servo controller 1D of the third embodiment shown in FIG. 5 is different from the servo controller 20 of the first embodiment at the point that the servo controller 1D of the third embodiment includes two correction data calculation means 20C, 20D for correcting the position deviation of the feed side motors 26A, 26B. Each correction data calculation means 20C, 20D is the same as the correction data calculation means 20 of the first embodiment. According to the synchronization error between the position deviation of the spindle motor 25 and the position deviation of the individual feed side motors 26A, 26B, the correction data can be calculated. When the position deviation of two motors 26A, 26B is corrected by the individual correction data calculation means 20C, 20D, the machine tool 50 of the tandem structure can highly accurately machine a work. Other points of the structure are the same as those of the first embodiment. Therefore, an explanation is not given here.

In the fourth embodiment of the servo controller shown in FIG. 6, two feed side servo motors 26A, 26B use one correction data calculation means 20C in common. From this viewpoint, the fourth embodiment is different from the third embodiment. This correction data calculation means 20C calculates correction data according to the synchronization error between the position deviation of the spindle motor 25 and the position deviation of one feed side motor 26A. When the calculated correction data is added to the position deviation of the two feed side motors 26A, 26B, the spindle motor 25 and the feed side motor can be synchronously controlled. This embodiment is preferably used in the case where the two feed side motors 26A, 26B are respectively given the same load.

In the fifth embodiment of the servo controller shown in FIG. 7, two feed side servo motors 26A, 26B use one correction data calculation means 20C in common. On this point, the fifth embodiment is the same as the fourth embodiment. However, the fifth embodiment is different from the fourth embodiment at the point that two synchronization errors with respect to the individual feed side motors 26A, 26B are used in the correction data calculation means 20C which is used in common. The two synchronization errors are weighted by the synchronization error averaging means 40 according to the loads given to the two feed side motors 26A, 26B. The reason why the synchronization errors are weighted is that even when the same motors are used for the feed side motors 26A, 26B, for the reasons of the structure of the machine tool, the loads given to the servo motors, which are synchronously operated, are not equal to each other in some cases.

Weighting is conducted by the synchronization error averaging means 40 as follows. A balance point of the two feed side motors 26A, 26B is expressed by the internal ratio n. One synchronization error is multiplied by n, and the other synchronization error is multiplied by (1−n). The internal ratio n can be expressed by n=T1/(T1+T2), wherein the torque of the feed side motor 26A is T1 and the torque of the feed side motor 26B is T2. When the two synchronization errors, which have been weighted, are added, the averaged synchronization errors are calculated. The averaged synchronization error can be expressed by n×ERR (synchronization error)+(1−n)×ERR (synchronization error).

The correction error calculation means 20C finds correction data according to the averaged synchronization error. When the calculated correction error is added to the position deviation of the two feed side motors 26A, 26B, the spindle motor 25 and the feed side motor can be controlled synchronously with each other. This embodiment is preferably used for a case in which the two feed side motors 26A, 26B are respectively given a different load.

Figure 8:
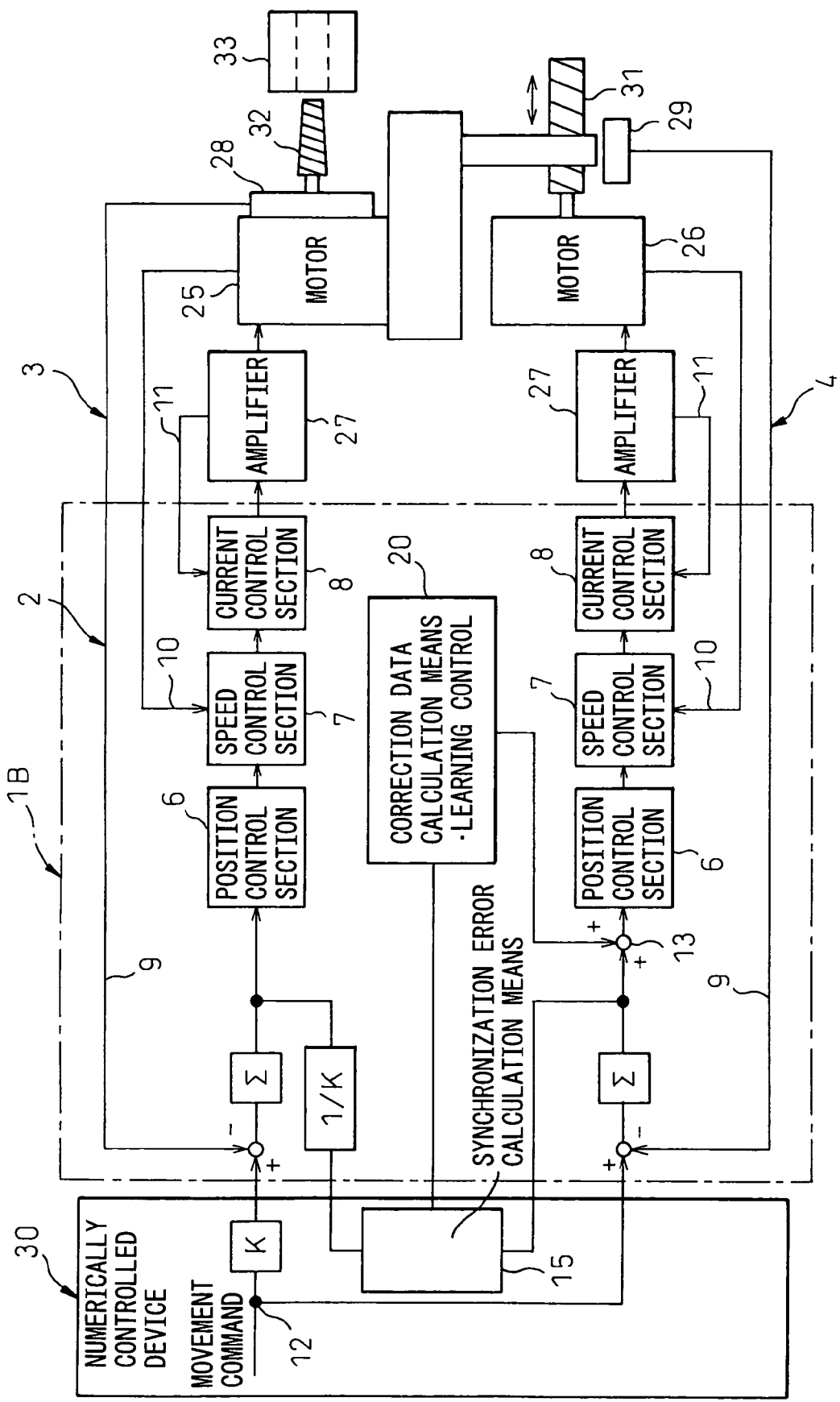
FIG. 8 is a block diagram showing a variation of the servo controller of the second embodiment shown in FIG. 2.

In this connection, it should be noted that the present invention is not limited to the above specific embodiment. Various variation may be made. For example, as a variation of the second embodiment, as shown in FIG. 8, the synchronization error calculation means 15 is provided in the numerical controller 30, and the correction data can be transferred between the correction data calculation means 20 of the servo controller 1B and the numerical controller 30. In this case, simultaneously when the data is transmitted, the memory means 18 may be divided into a predetermined sampling number and it may be commanded that the data is accommodated in a predetermined memory region. The memory region can be found by L/T, wherein the same machining pass section is L and the sampling number is T. A delay of communication is generated for sending and receiving data especially between the numerical controller 30 and the servo controller 1B. However, when the delay of communication is recovered by advancing at the time of accommodating the data in a predetermined memory region, this delay of communication can be compensated. Due to the foregoing, it becomes unnecessary to provide a circuit for linearly conducting communication in the servo controller 1B. Accordingly, the manufacturing cost can be advantageously reduced.

Figure 9:
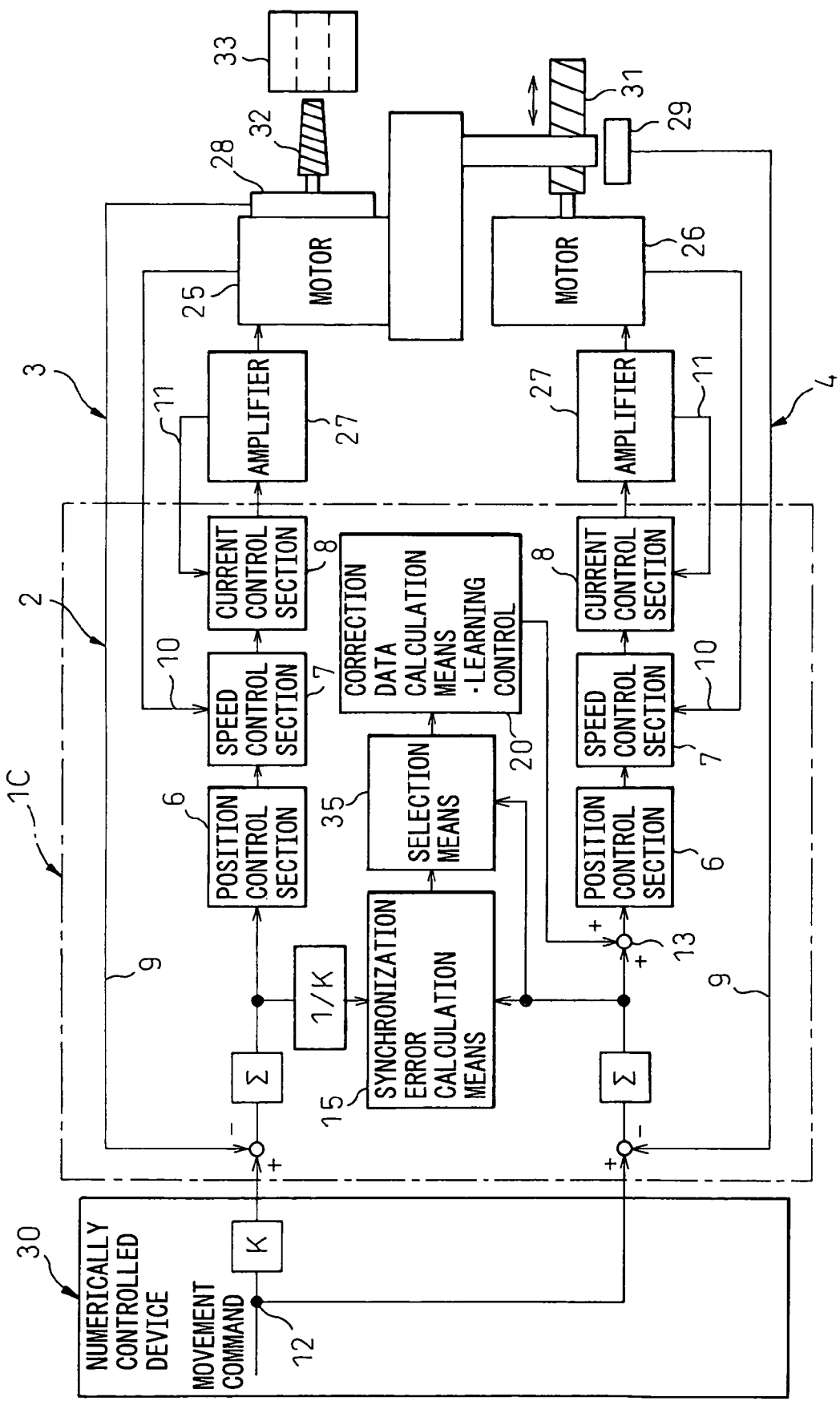
FIG. 9 is a block diagram showing another variation of the servo controller of the second embodiment shown in FIG. 2.

As shown in FIG. 9, the servo controller 1C can includes a switch (switch means) 35 capable of selecting one of the synchronization error and the position deviation of the feed side servo motor 26. According to one data selected by the switch 35, correction data for correcting the position deviation of the feed side servo motor 26 is calculated, and the thus calculated correction data is added to the position data of the feed side servo motor 26. Due to the foregoing, control can be conducted so that an amount of the synchronization error can be reduced. Alternatively, during the synchronizing operation, an amount of the synchronization error can be reduced. During the usual operation in which the synchronizing operation is not conducted, the position deviation can be reduced.

Figure 10:
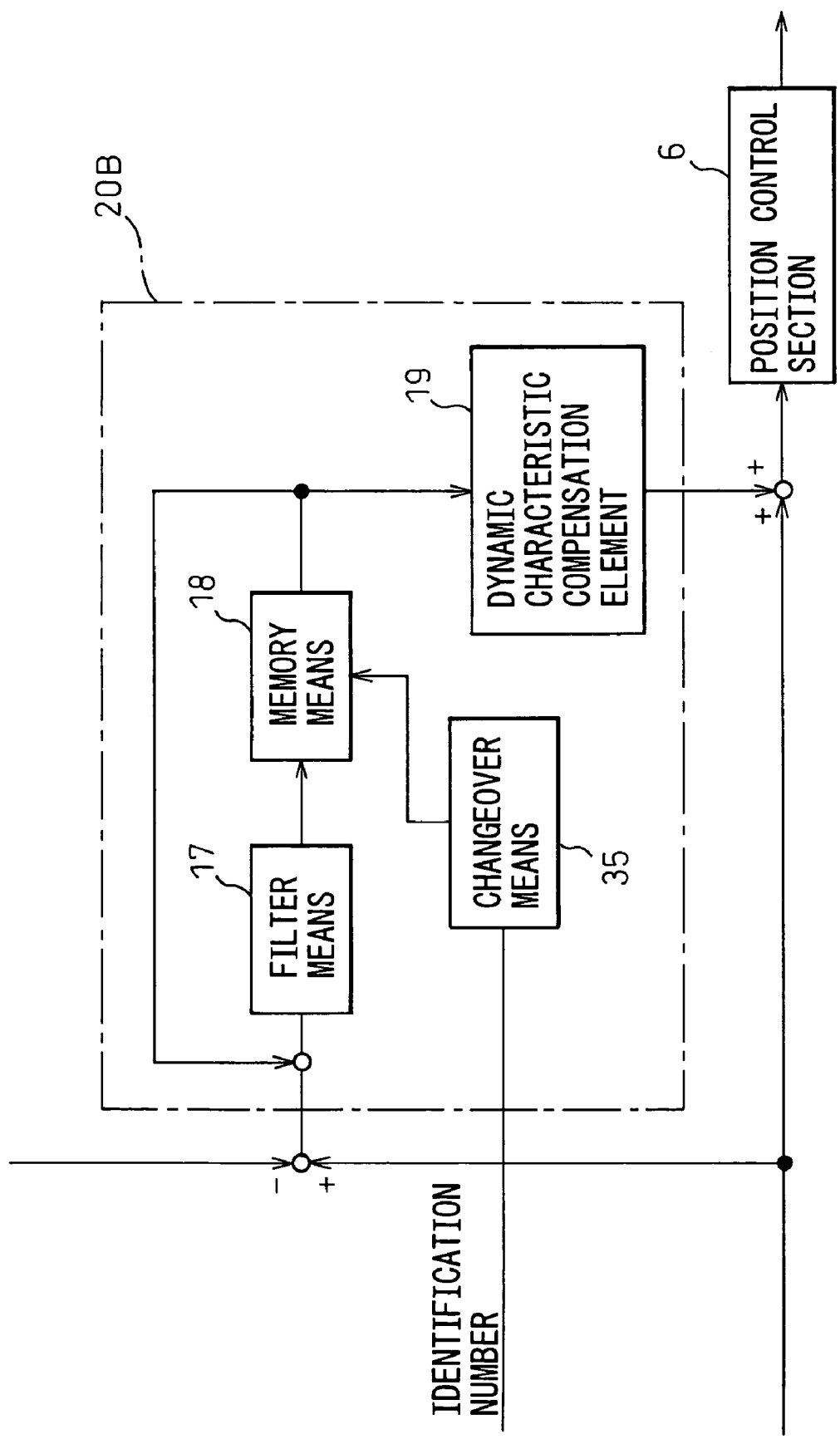
FIG. 10 is a view showing another variation of the correction data calculation means of the servo controller of the second embodiment shown in FIG. 2.

As shown in FIG. 10, the correction data calculation means 20B may include a changeover means 35 for changing over a storage region, which conducts learning control, corresponding to an identification number when a synchronization control command is given the identification number. Due to the foregoing, when the storage region is changed over for each command of a different cutting condition, it becomes possible to cope with a different type synchronization command. Accordingly, the flexibility can be enhanced.

In the third to the fifth embodiment, the servo controllers 1D to 1F are applied to the machine tool 50 of the tandem structure having two feed side servo motors 26A, 26B. However, it is possible to apply the servo controllers 1D to 1F to the machine tool of the tandem structure having three or more feed side servo motors 26A, 26B.

Preferred embodiments of the present invention are explained above. However, it should be noted that variations may be made by those skilled in the art without departing from the scope of the claim of the present invention described later.

The invention claimed is:

1. A servo controller for synchronously controlling a plurality of drive sources, comprising:
a correction data calculation means for calculating correction data to correct a positional deviation of a slave side drive source according to a synchronization error which is a difference between a positional deviation of a master side drive source to drive one drive axis and a positional deviation of the slave side drive source to drive the other drive axis,
wherein the correction data calculation means comprises a filter portion for restricting a resonance frequency band, a storage portion for storing the correction data at each predetermined period with reference to time so as to conduct learning control and a dynamic characteristic compensation element to compensate a phase delay and a gain reduction for the slave side drive source,
wherein the master side drive source and the slave side drive source are synchronously controlled when the correction data is added to the positional deviation of the slave side drive source.

2. A servo controller according to claim 1, wherein the servo controller is applied to a machine tool, the one drive axis of which is a rotary axis and the other drive axis of which is a feed axis.

3. A servo controller according to claim 2, wherein the machine tool conducts tapping for forming a female screw in a work.

4. A servo controller according to claim 2, wherein the machine tool conducts thread-cutting for forming a male screw on an outer circumferential face of a work.

5. A servo controller according to claim 1, wherein a movement command sent to the master side drive source and the slave side drive source has an identification number, the servo controller further comprising a changeover means for changing over a storage region, which conducts learning-control, corresponding to the identification number.

6. A servo controller according to claim 1, further comprising a storage means for storing the correction data at each sampling with reference to position so as to conduct learning-control when the time is converted to the position.

7. A servo controller according to claim 1, wherein the servo controller is applied to a machine tool in which two slave side drive sources are provided and the slave side drive sources respectively drive a first feed axis of the tandem structure and the second feed axis of the tandem structure which are arranged in parallel to each other.

8. A servo controller according to claim 7, wherein the correction data calculated according to the synchronization error caused between the master side drive source and one slave side drive source is added to the position deviation of both the slave side drive sources.

9. A servo controller according to claim 7, wherein the correction data calculation means is used in common between the two slave side drive sources, and the two synchronization errors to be inputted into the correction data calculation means are weighted by a predetermined internal ratio according to a load balance between the first and the second feed axis.

10. A servo controller for synchronously controlling a plurality of drive sources, comprising:
a selection means for selecting one of the synchronization error, which is a difference between a positional deviation of a master side drive source to drive one drive axis and a positional deviation of the slave side drive source to drive the other drive axis, and the positional deviation of the slave side drive source; and
a correction data calculation means for calculating correction data to correct the positional deviation of the slave side drive source according to one data selected by the selection means,
wherein the correction data calculation means comprises a filter portion for restricting a resonance frequency band, a storage portion for storing the correction data at each predetermined period with reference to time so as to conduct learning control and a dynamic characteristic compensation element to compensate a phase delay and a gain reduction for the slave side drive source,
wherein the correction data is added to the positional deviation of the slave side drive axis so as to make the positional deviation or the synchronization error come close to zero.

* * * * *